United States Patent
Büttel et al.

(10) Patent No.: US 7,093,639 B2
(45) Date of Patent: Aug. 22, 2006

(54) METHOD AND APPARATUS FOR SEALING AND CUTTING OF FOIL TUBES

(75) Inventors: Ulrich Büttel, Oldenburg (DE); Gerritt A. B., Twist (DE); Frank Berrenbaum, Solingen (DE)

(73) Assignee: D.R. Joseph, Inc., Grand Prairie, TX (US)

( * ) Notice: Subject to any disclaimer, the term of this patent is extended or adjusted under 35 U.S.C. 154(b) by 75 days.

(21) Appl. No.: 10/656,448

(22) Filed: Sep. 5, 2003

(65) Prior Publication Data

US 2004/0188007 A1 Sep. 30, 2004

Related U.S. Application Data

(60) Provisional application No. 60/480,700, filed on Jun. 23, 2003.

(30) Foreign Application Priority Data

Sep. 5, 2002 (DE) ................................ 102 41 592

(51) Int. Cl.
*B32B 37/04* (2006.01)
*B32B 38/04* (2006.01)

(52) U.S. Cl. ...................... 156/515; 156/251; 156/259; 156/516; 83/171

(58) Field of Classification Search ................ 156/250, 156/251, 259, 515, 516, 517, 518; 83/171
See application file for complete search history.

(56) References Cited

U.S. PATENT DOCUMENTS

| | | | | |
|---|---|---|---|---|
| 3,052,282 A | * | 9/1962 | Bruckhauser et al. | 156/515 |
| 3,156,010 A | * | 11/1964 | Osborn, Jr. | 156/515 |
| 3,251,252 A | * | 5/1966 | Lefevre | 83/16 |
| 3,874,975 A | * | 4/1975 | Lagain | 156/515 |
| 4,070,222 A | * | 1/1978 | Olson | 156/251 |
| 4,308,087 A | * | 12/1981 | Johnson | 156/510 |
| 4,396,449 A | * | 8/1983 | Tumminia | 156/251 |
| 5,050,469 A | * | 9/1991 | Snelling | 83/16 |
| 6,103,050 A | * | 8/2000 | Krueger | 156/251 |
| 6,635,139 B1 | * | 10/2003 | Bohn et al. | 156/251 |

* cited by examiner

*Primary Examiner*—Mark A. Osele
(74) *Attorney, Agent, or Firm*—Hill Law Firm

(57) ABSTRACT

A procedure and device for longitudinal sealing and cutting of a film web, in particular a foil tube, in which the film web shows at least two layers of film, made of thermoplastic synthetic material, and in which the film web is sealed and cut in a continuous process by leading it through the device, in which the film first contacts the heating element in order to seal the two film layers by welding, in order to cut this sealed seam in the middle of the seam by guiding the film web over the cutting element, which dividends the sealed seam into at least two partial film tubes.

14 Claims, 3 Drawing Sheets

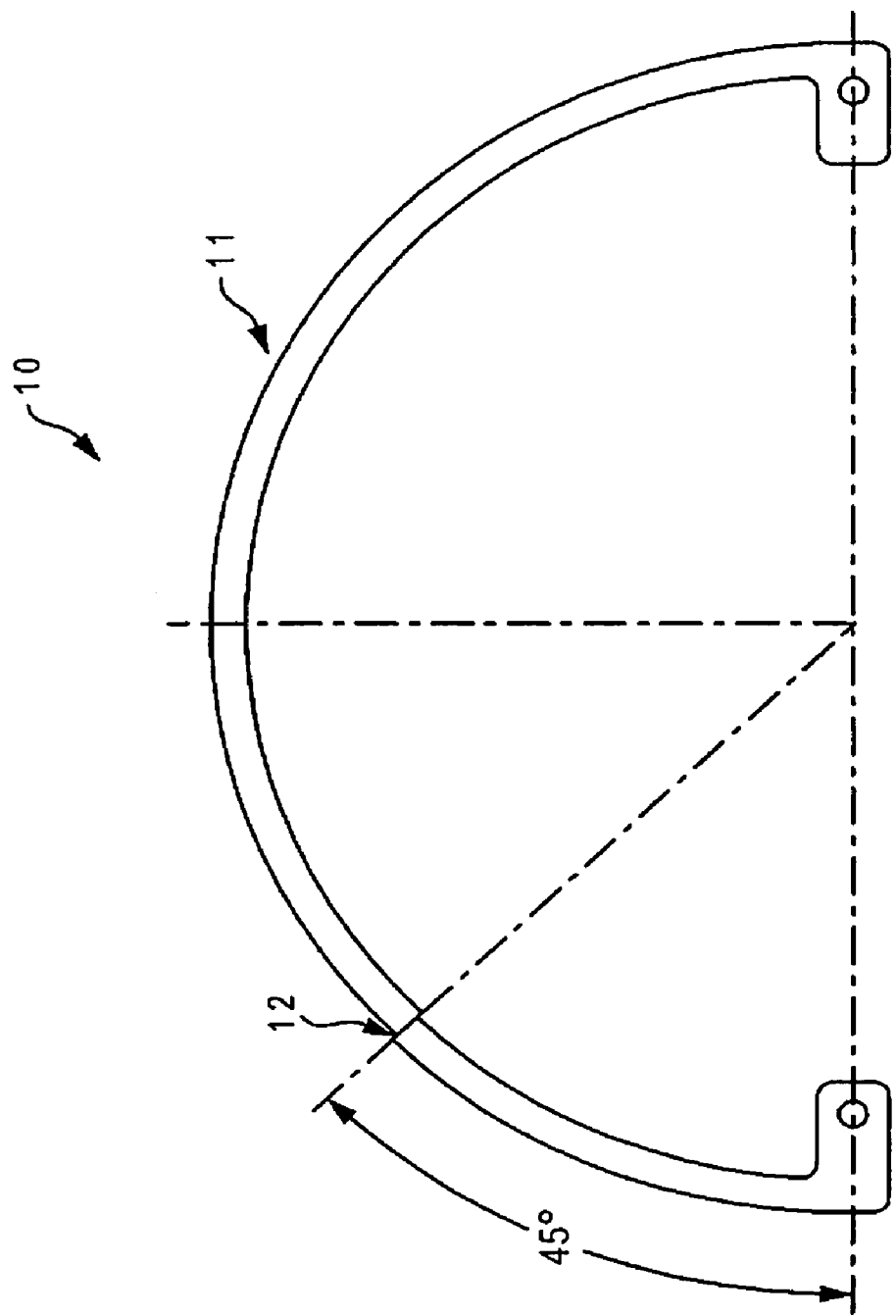

METHOD AND APPARATUS FOR SEALING AND CUTTING OF FOIL TUBES

CLAIM OF PRIORITY

This application claims the benefit of U.S. Provisional Application Ser. No. 60/480,700, filed 23 Jun. 2003, entitled "PROCEDURE AND DEVICE FOR SEALING AND CUTTING OF FOIL TUBES." This provisional application is incorporated herein as if fully set forth.

This application claims the benefit of German Paten Application Serial No. 102 41 592.7, filed 5 Sep. 2002.

BACKGROUND OF THE INVENTION

1. Field of the Invention

The present invention is directed to a method of lengthways sealing and cutting of a foil tube. The foil tube has at least two layers lying on each other and is made of thermoplastic synthetic material. The foil tube is brought to a device suitable for the sealing and cutting in accordance with the present invention.

Additionally, the invention is directed to an apparatus for the sealing and cutting of such a foil tube. The invention has application in that at least one foil tube results into a tube of reduced width.

The invention has application in the production of garbage bags and in the production of bags for the receiving of food, such as thin thermoplastic foils produced in long double-layered tubes.

2. Description of the Prior Art

In prior art processing systems, the layered films are first cut longitudinally and then immediately sealed with each other at the cut edges by heat influence.

The foil tube is brought to a blade over a mostly convex conducting metal. The blade first splits the tube with the edge at the front. The foil is also being heated by means of a seal strip and melts the cut edges of the tube together. The melted edges connect themselves in a lengthways seal seam.

The prior art process is known as a "Slit Seal" procedure. The lengthways seal seam has a characteristic bead of material that increases the overall thickness of the foil by more than 20% of the foil thickness. When winding the tubes manufactured in this manner, the possible diameter of the rolls will be limited by the accumulated diameter of the built up edges, which arises by the Slit Seal procedures. The seam strength moreover decreases particularly with increasing foil thickness.

A further disadvantage is that when the film is guided over a convex plate, electrostatic charges build-up and wrinkles are a likely result. Additionally, during the slit seal procedure, the sealing elements emit considerable heat that needs to be eliminated by an intricate water-cooling system. Finally, the melted foil, as it passes over the convex plate, can create a build up of thermoplastic strings or spiders that require the periodic removal from the plate.

SUMMARY OF THE INVENTION

A procedure and device is provided for longitudinal sealing and cutting of a film web, in particular a foil tube, in which the film web shows at least two layers of film, made of thermoplastic synthetic material, and in which the film web is sealed and cut in a continuous process by leading it through the device. The film first contacts the heating element in order to seal the two film layers by welding. Next, a cutting element is used to cut this sealed seam in the middle of the seam by guiding the film web over the cutting element. This dividends the sealed seam into at least two partial film tubes.

It is one objective of the present invention to create a procedure for the sealing and cutting of such foils, that can be converted with simple and economical means and produces stable seal seams at high processing speeds, without the characteristic bead and build up of spiders.

It another objective of the present invention to create a device for the execution of the procedure that stands out due to a simple and compact construction.

The present invention first welds the surfaces of the two film-layers together, followed by a cutting action in the sealed area along a stripe. According to the invention the process is first sealing and then cutting.

For this purpose, according to the invented procedure, the double-layered film is led flatly over a stationary heating element, in order to achieve a seal by merging the film-layers with each other. The created seal seam is then led over a knife, which divides the sealed film tube along the seal seam, particularly in the middle of the seal seam.

The above as well as additional objectives, features, and advantages will become apparent in the following description.

BRIEF DESCRIPTION OF THE DRAWINGS

The novel features believed characteristic of the invention are set forth in the appended claims. The invention itself however, as well as a preferred mode of use, further objectives and advantages thereof, will best be understood by reference to the following detailed description of the preferred embodiment when read in conjunction with the accompanying drawings, wherein:

FIG. 3 is a detail from the longitudinal section.

DETAILED DESCRIPTION OF THE INVENTION

Figure 1:
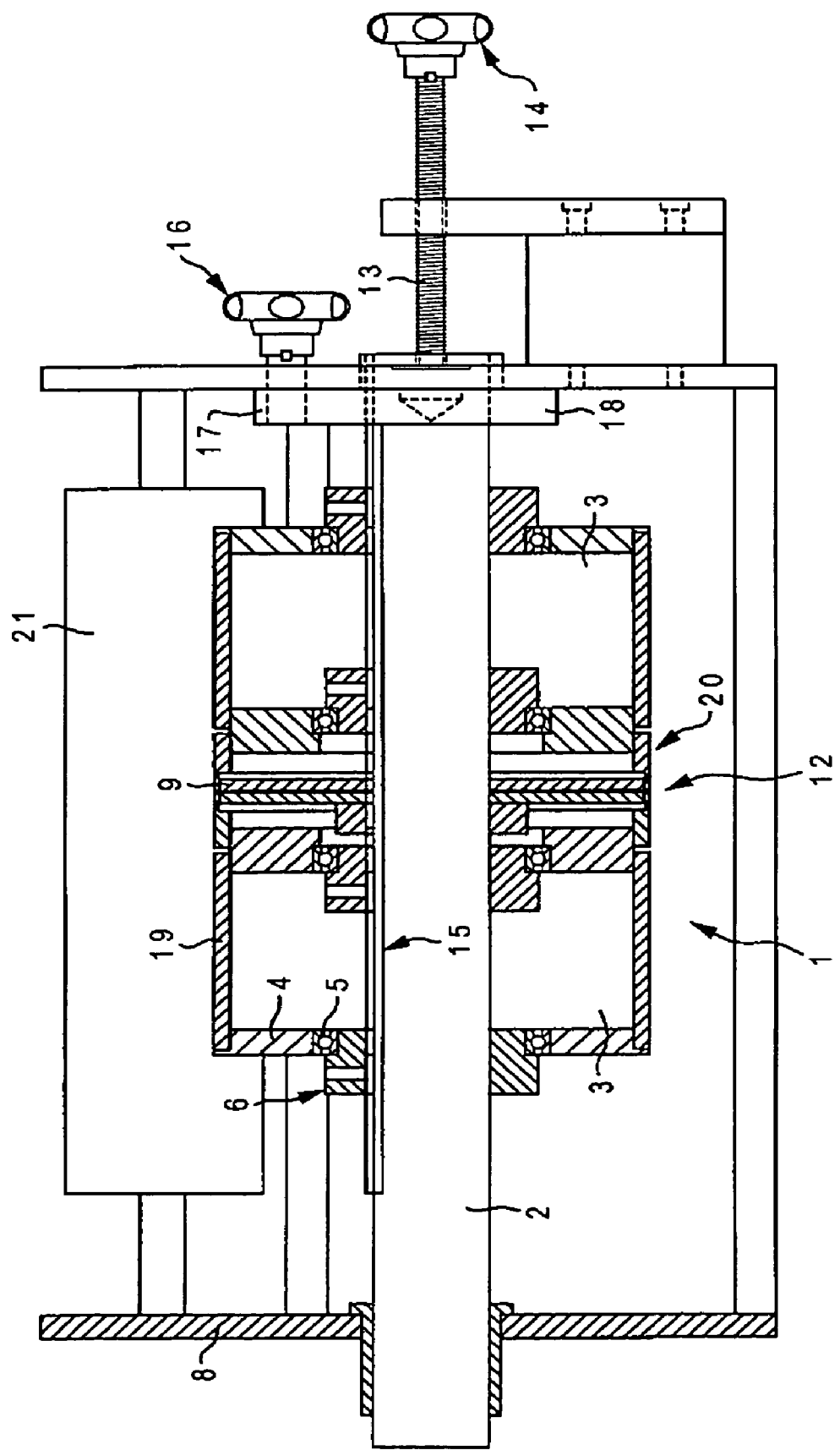
FIG. 1 is a longitudinal section of the invented device.

The present invention is directed to a method of lengthways sealing and cutting of a foil tube. The foil tube has at least two layers lying on each other and is made of thermoplastic synthetic material. The foil tube is brought to a device suitable for the sealing and cutting in accordance with the present invention.

Additionally, the invention is directed to an apparatus for the sealing and cutting of such a foil tube. The invention has application in that at least one foil tube results into a tube of reduced width.

The invention has application in the production of garbage bags and in the production of bags for the receiving of food, such as thin thermoplastic foils produced in long double-layered tubes.

During the extrusion or the further processing these comparatively broad tubes are cut into narrower double-layered films, which are sealed at the edges of the film. This results in the creation of more narrow tubes.

These are rolled up for the finishing process, particularly for a subsequent crossways sealing on rolls.

The plastic films have thickness of some few microns up to about 200 microns. Since the end products are mass-produced articles, high machine processing speeds are obtained (up to 250 meters per minute).

In prior art processing systems, the layered films are first cut longitudinally and then immediately sealed with each other at the cut edges by heat influence.

The foil tube is brought to a blade over a mostly convex conducting metal. The blade first splits the tube with the edge at the front. The foil is also being heated by means of a seal strip and melts the cut edges of the tube together. The melted edges connect themselves in a lengthways seal seam.

The prior art process is known as a "Slit Seal" procedure. The lengthways seal seam has a characteristic bead of material that increases the overall thickness of the foil by more than 20% of the foil thickness. When winding the tubes manufactured in this manner, the possible diameter of the rolls will be limited by the accumulated diameter of the built up edges, which arises by the Slit Seal procedures. The seam strength moreover decreases particularly with increasing foil thickness.

A further disadvantage is that when the film is guided over a convex plate, electrostatic charges build-up and wrinkles are a likely result. Additionally, during the slit seal procedure, the sealing elements emit considerable heat that needs to be eliminated by an intricate water-cooling system. Finally, the melted foil, as it passes over the convex plate, can create a build up of thermoplastic strings or spiders that require the periodic removal from the plate.

It is one objective of the present invention to create a procedure for the sealing and cutting of such foils, that can be converted with simple and economical means and produces stable seal seams at high processing speeds, without the characteristic bead and build up of spiders.

It another objective of the present invention to create a device for the execution of the procedure that stands out due to a simple and compact construction.

The present invention first welds the surfaces of the two film-layers together, followed by a cutting action in the sealed area along a stripe. According to the invention the process is first sealing and then cutting.

For this purpose, according to the invented procedure, the double-layered film is led flatly over a stationary heating element, in order to achieve a seal by merging the film-layers with each other. The created seal seam is then led over a knife, which divides the sealed film tube along the seal seam, particularly in the middle of the seal seam.

Then the wide film tube can be confectioned or divided into at least two parallel tubes. The advantage of the procedure according to invention has to be emphasized: the film layers welded together on the surface accumulate far less of a bead than if welded together at the edges of the film layers. Therefore it is possible to produce more equal and steady rolls, which simplifies the handling and further processing fundamentally.

In particular, the procedure can simply, and with little machine effort, be carried out, if the foil tubes lying on each other are pressurized by the heating element that physically contact only one side of the foil. The heat that is necessary for the sealing will go through the so-called sandwich of film-layers, by lying on the heating element.

Both foils melt, so that this one doesn't come only for a sticking together to unite it with the other foil, but that both foils weld together with each other and it comes to a permanent connection.

It is possible, with a special calibration of the heating element, to create a sequenced intermittent seal seam, which seals selectively the two film-layers on each other. It is however necessary for the production of watertight bags that a continuous sealing is managed by the heating element.

Such a watertight longitudinal seal can be made with this procedure at a high speed and with the highest strength.

It has proved to be advantageous, by fixing the two film layers on each other, at least in the seal area, by a static charge. Through this, relative motions and air bubbles between the film layers are avoided, in order to achieve equal and constant seam strength. A device suitable for the realization of the procedure shows a bearing surface, on which the foil tube is guided under pressure. Through this, an advantageous method of the support pressure is produced, because the bearing surface has a convex curvature, which is embraced by the film layers. Also the device includes a heating element, which seals the film layers, in order to create a film tube. This heating element can pressurize the foil tube to the bearing surface from above as well as from below.

As explained in the following, it is, however, particularly simple and thereby advantageous, if the heating element is integrated approximately in the level of the bearing surface and the heat to seal the film layers, reaches, in reference to the bearing surface, the foil from "below". Due to the fact that the heating element is also the cutting element, means that the longitudinal seam can only be cut in the middle.

In order to minimize the friction, reduce scratching of the foil tube, and avoid the build up of a static charge, it is advantageous, if the bearing surface is formed by a rotateable stored roller, on which the film is supported over its angular range. The angular range can be up to 180° and is adjustable in a preferred execute mode.

Therefore a pulley can be ordered in front and/or behind of the roller, in order to adjust the size of the angular range and therefore also the bearing surface.

The film will only be led over idling rollers, in order to minimize static charge and wrinkles, even if the web-tension is very high.

It is constructively very simple, and therefore advantageous, if the heating element is integrated into the roller. That is why the main roller has a cut out, in which the heating element is tightly integrated.

The heating element has a heating surface, which lies approximately in the level of the waltzing surface or even a little above of it. Therefore the film web is led over the roller in order to get in contact with the heating element so that the effective heat transferred by the heating element creates a longitudinal seal. In a particularly simple form, the heating element is made out of a particularly round or flat resistance wire, which surface is in contact with the film layers. The resistance wire is provided by a current source. Accordingly to invention it is ensured, that the energy consumption and the warmth irradiation are low, and that no cooling is required.

In order to create a device as compact as possible, it is advantageous if the cutting element with a blade is directly attached to the heating element in extent direction of the roller. In the ideal case, the cutting element and the heating element are summarized in a common component, the so-called seal/cut element.

As explained in the following example, the seal/cut element function can be simply carried out by the resistance wire. Constructively, it has to be preferred, particularly, if several ball bearing waltzing elements behind each other, are ordered on a common axis, in which seal/cut elements are respectively ordered between the two waltzing elements. So a foil tube can be shared in several partial tubes at the same time.

In order to create an increased flexibility of the device, it has to be able to seal and cut several sizes of film web. It also has to be capable to seal and cut as many as required film tubes out of one tube. It is also advantageous, if the roller is modularly built up, and if the axis can be provided with several roller elements with seal/cut elements between them. It is also advantageous, if the roller and/or the roller elements are adjustable in an axial direction on the axis.

FIG. 1 shows a device for sealing and cutting of a foil tube 7 (to FIG. 2), which in this case a blown film tube with two film layers laying on each other. The shown device divides the foil tube into two partial tubes with the correspondingly halved web width and also the halved perimeter. As a bearing surface, at which the film layers are led through under pressure, the device shows a roller 1, which consists of two waltzing elements 3 ordered behind each other on a common rigid axis 2.

Hubs 4 of the waltzing elements 3 run by means of ball bearings 5 on disks 6, these are kept on the axis 2. The axis 2 is formed in a frame 8. The surfaces of the waltzing elements 3 are created out of cylinders 19. The roller 1 shows a cutout on the scale, in this cutout a heating element is tightly integrated, in which the heating element shows a heating surface, which comes outside of the roller surface, and therefore contacting the film-web. Therefore a seal/cut element 9 is integrated between the waltzing elements 3, this is equipped with a wire element 10 (FIG. 3) made from a flat resistance wire.

Insulating washers 20 opposite the cylinders separates the seal/cut element 9. The wire element 10 is supplied by electrical power, which heats up the heating element. In this case the film-layers lay on each other and are welded together in order to create a film tube.

In the sealing area 11, the diameter of the wire element 10 is proportionally not much more (here approximately 1 mm.) than the diameter of the roller. This ensures that the film web is pressed to the roller, by leading it through the roller elements, and therefore in contact with the wire element.

The foil tube 7 contacts the wire element 10, in an angular range of 135°, before the outside diameter of the wire element 10 enlarges at a cutting edge 12, in this figure an enlargement of approximately 2 mm.

The sealed partial tubes are separated out from the foil tube at the cutting edge 12. The cutting edge 12 is therefore part of a cutting element, which is cutting in the middle of the sealed seam. It attaches to the heating element with the cutting edge 12 in extent direction of the roller. In addition, the wire element 10 forms a seal/cut element with the seal area 11 and the cutting edge 12. The roller 1 is kept on the axis 2 by means of a guide 15 in which the disks 6 are screwed together against the axis 2.

For the fine-adjustment the complete axis 2 can be moved by a thread rod 13 attacking at the end wall with hand wheel 14 in an axial direction. So the position of the sealed seam can be moved within the foil tube. By using another hand wheel 16 a pair of sprockets 17 moves sprocket 18, which is fixed on axis 2. With this device axis 2 can be turned in order to change the length of contact with the film web and the sealing area 11.

Figure 2:
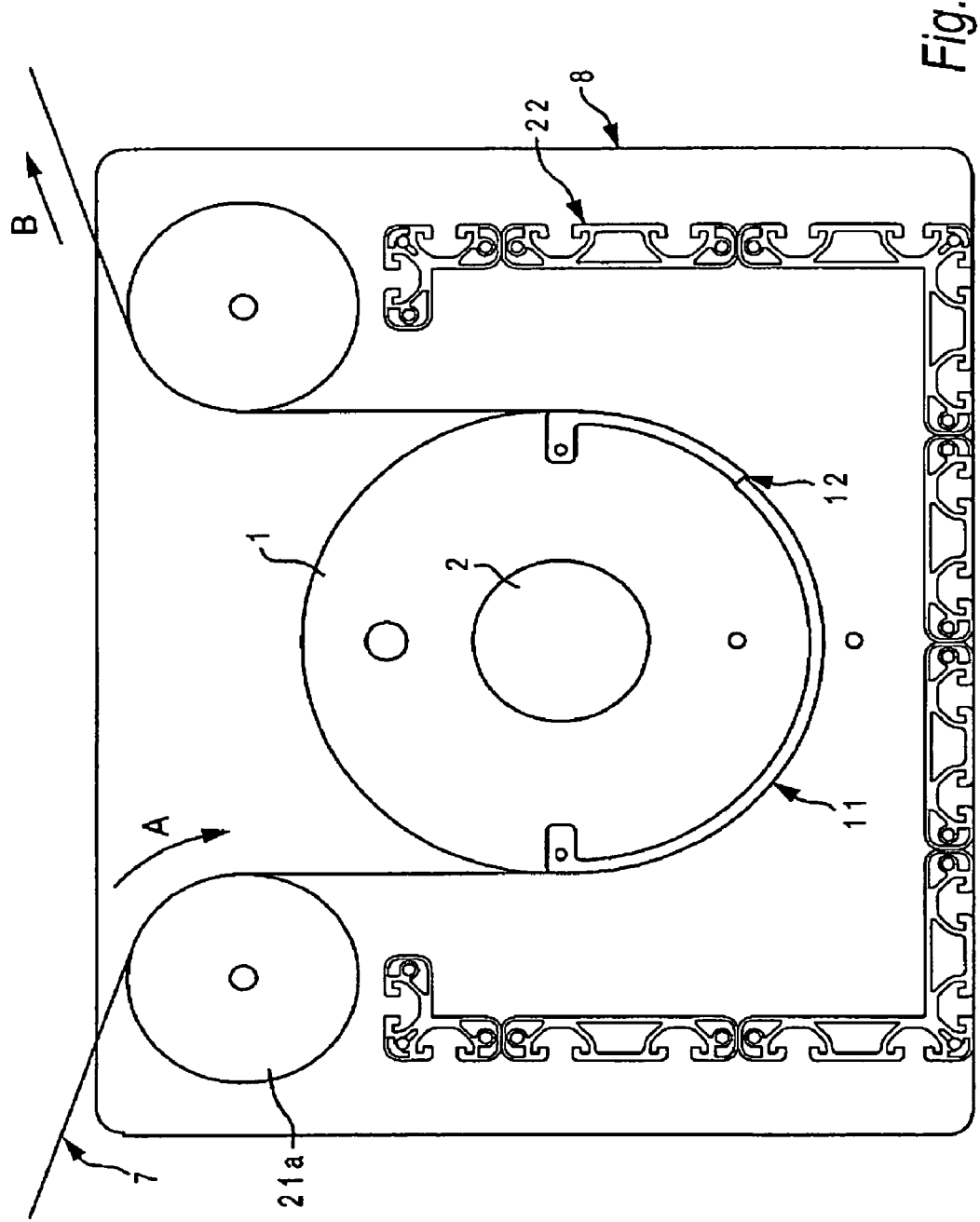
FIG. 2 is a cross-cut section of the device according to invention.

Depending on adjustment, the foil tube 7 reaches the seal area 11 at a later point. By changing the length of the seal way, the heat influence on the foil will also be changed. As FIG. 2 shows, one pulley 21 each, is ordered in front and behind of the roller 1, which lead (arrow A) the film web 3 over the pulley 21a, and leaves (arrow B) the device as sealed and partially cut tubes.

Also the situation of the seal cut element can be recognized together with seal area 11 and cutting edge 12. For safety reasons the device is partly surrounded by a container 22. In this execution example the pulleys 21 have a diameter of 80 mm, and the roller with the integrated seal/cut element has a diameter of 180 mm. The roller with the integrated seal/cut element can be adjusted in both directions for approximately 25 mm.

The seal station can be rotated to be able to adapt the contact between the film and the seal station to the line speed and foil thickness. The unit is completely encapsulated and provided with a tube-connection to be able to siphon any potential smoke. Temperature regulation and transformer are put in a separate control cabinet.

Although the invention has been described with reference to a particular embodiment, this description is not meant to be construed in a limiting sense. Various modifications of the disclosed embodiments as well as alternative embodiments of the invention will become apparent to persons skilled in the art upon reference to the description of the invention. It is therefore contemplated that the appended claims will cover any such modifications or embodiments that fall within the scope of the invention.

What is claimed is:

1. A device for cutting and sealing a film web, the film web having at least two layers, the device comprising:
   a cylindrical roller that rotates in a first circumferential direction about an axis, the roller having a surface, and further having a circumferential opening in the surface;
   an arcuate sealing/cutting element within the roller opening and projecting above the roller surface, whereby the sealing/cutting element contacts a film web being carried by the roller, wherein the sealing/cutting element is heated, wherein the sealing/cutting element lies in a plane perpendicular to the roller axis and remains fixed in position when the roller rotates, wherein the sealing/cutting element projects radially beyond the surface of the roller, and wherein the sealing/cutting element has at least a first radius that projects a first distance beyond the roller surface for a first portion of the element, and at least a second radius, greater than the first radius, that projects a second distance beyond the roller surface for a second portion of the element.

2. The device for cutting and sealing a film web in accordance with claim 1, wherein the roller and sealing/cutting element are adjustable in the axial direction along the roller axis.

3. The device for cutting and sealing a film web in accordance with claim 1, wherein the fixed position of the sealing/cutting element can be adjusted circumferentially with respect to the roller axis.

4. The device for cutting and sealing a film web in accordance with claim 1, wherein the roller comprises at least two parts separated by the opening, wherein the separate roller parts are free to rotate independently about the roller axis.

5. The device for cutting and sealing a film web in accordance with claim 1, wherein the first radius extends along a first arc of the cutting/sealing element to define a first angle, and wherein the second radius extends along a second arc of the cutting sealing device to define a second angle.

6. The device for cutting and sealing a film web in accordance with claim 5, wherein the sealing/cutting element has exactly two different radii that project two different distances beyond the roller surface.

7. The device for cutting and sealing a film web in accordance with claim 6, wherein the sealing/cutting device has an edge that defines a radial step between the first and second arcs.

8. The device for cutting and sealing a film web in accordance with claim 5, wherein the film web is carried by the roller in the first circumferential direction, and wherein the web encounters the first arc before encountering the second arc.

9. The device for cutting and sealing a film web in accordance with claim 1, wherein the sealing/cutting element is heated by electrical resistance heating caused by a current passed through the element.

10. The device for cutting and sealing a film web in accordance with claim 1, further comprising:
a second arcuate sealing/cutting element identical to the sealing/cutting element and located in a second circumferential opening in the roller.

11. The device for cutting and sealing a film web in accordance with claim 10, wherein the roller comprises at least three parts separated by the slots, wherein the separate roller parts are free to rotate independently about the roller axis.

12. The device for cutting and sealing a film web in accordance with claim 11, wherein the roller parts and the sealing/cutting elements are adjustable in the axial direction along the roller axis.

13. The device for cutting and sealing a film web in accordance with claim 1, wherein the sealing/cutting element presents an edge to the film web moving over it, and wherein the presented edge is flat.

14. The device for cutting and sealing a film web in accordance with claim 1, wherein the sealing/cutting element presents an edge to the film web moving over it, and wherein the presented edge is rounded.

* * * * *